(12) United States Patent
Bahgat et al.

(10) Patent No.: US 11,970,781 B2
(45) Date of Patent: Apr. 30, 2024

(54) PROBE FOR MEASURING A CATHODIC PROTECTION CONDITION OF A BURIED STEEL STRUCTURE, AND BACKFILL COMPOSITION FOR SAME

(71) Applicant: Corrosion Service Company Limited, Markham (CA)

(72) Inventors: Hycem Bahgat, Markham (CA); William Daniel Fingas, Markham (CA)

(73) Assignee: Corrosion Service Company Limited

( * ) Notice: Subject to any disclaimer, the term of this patent is extended or adjusted under 35 U.S.C. 154(b) by 567 days.

(21) Appl. No.: 17/172,107

(22) Filed: Feb. 10, 2021

(65) Prior Publication Data

US 2021/0246561 A1 Aug. 12, 2021

Related U.S. Application Data

(60) Provisional application No. 62/972,145, filed on Feb. 10, 2020.

(51) Int. Cl.
*C23F 13/22* (2006.01)
*G01N 17/04* (2006.01)

(52) U.S. Cl.
CPC .......... *C23F 13/22* (2013.01); *G01N 17/043* (2013.01)

(58) Field of Classification Search
CPC ....... G01N 17/02; G01N 17/04; G01N 17/043
See application file for complete search history.

(56) References Cited

FOREIGN PATENT DOCUMENTS

| CZ | 3835 U1 | * | 9/1995 | |
| EP | 486057 A2 | * | 5/1992 | ............. G01N 17/02 |
| JP | 2020196924 A | * | 12/2020 | |

* cited by examiner

*Primary Examiner* — Noam Reisner
(74) *Attorney, Agent, or Firm* — Renner, Kenner, Greive, Bobak, Taylor & Weber

(57) ABSTRACT

A probe for measuring a cathodic protection condition of a buried steel structure includes: a body; a reference electrode accommodated in an interior of the body; and a volume of backfill accommodated in the interior of the body and at least partially surrounding the reference electrode. The backfill includes at least one of: zinc sulfate ($ZnSO_4$) and lithium acetate.

20 Claims, 13 Drawing Sheets

PROBE FOR MEASURING A CATHODIC PROTECTION CONDITION OF A BURIED STEEL STRUCTURE, AND BACKFILL COMPOSITION FOR SAME

CROSS-REFERENCE TO RELATED APPLICATION

This application claims the benefit of U.S. Provisional Application No. 62/972,145 filed on Feb. 10, 2020, the content of which is incorporated herein by reference in its entirety.

FIELD

The present invention relates generally to corrosion protection and in particular, to a probe for measuring a cathodic protection condition of a buried steel structure, and a backfill composition for the same.

BACKGROUND

Corrosion of metal is a well-known phenomenon, and occurs when the metal gives up electrons by electrochemical reactions with its surrounding environment. Corrosion can be prevented by forcing electrons into the metal from an external power source so as to deliberately lower the potential of the metal relative to its environment.

One commonly used approach to achieve this is impressed current cathodic protection, whereby an electromotive force (EMF) is used to provide electrons directly to a metal structure in its operating environment. This results in a "polarized potential" of the metal structure relative to the operating environment, which prevents the metal structure from serving as a source of electrons that would otherwise be required for oxidation reactions to proceed.

In the case of buried steel structures, such as pipelines, industry standards typically require measurement of the polarized potential as a way of inferring the corrosion condition of the structure. This can be achieved by permanently burying a bare steel coupon and a reference electrode, such as a zinc reference electrode, in ground adjacent to the steel structure. However, zinc has a tendency to passivate itself under certain electrolytic conditions, such as high oxygen partial pressure and high humidity, by reacting with oxygen or hydroxy ions present in the soil. Such passivation results in the growth of an oxide layer on the zinc surface, which interferes with the surface potential of zinc and eventually renders the electrode unreliable for potential measurement.

Achieving consistently accurate measurements for all electrolytic environments experienced by a pipeline would provide greater confidence to regulators, insurers and the general public that the pipeline operator's structural integrity efforts are effective.

It is therefore an object at least to provide a novel probe for measuring a cathodic protection condition of a buried steel structure, and a backfill composition for the same.

SUMMARY

It should be appreciated that this summary is provided to introduce a selection of concepts in a simplified form that are further described below in the detailed description. This summary is not intended to be used to limit the scope of the claimed subject matter.

In one aspect, there is provided a probe for measuring a cathodic protection condition of a buried steel structure, the probe comprising: a body; a reference electrode accommodated in an interior of the body; and a volume of backfill accommodated in the interior of the body and at least partially surrounding the reference electrode, the backfill comprising at least one of: zinc sulfate ($ZnSO_4$); and lithium acetate.

The backfill may comprise both zinc sulfate and lithium acetate.

The backfill may further comprise at least one of gypsum and bentonite.

The backfill may comprise between 1% and about 40% by weight of zinc sulfate. The backfill may comprise between about 10% and about 30% by weight of zinc sulfate. The backfill may comprise between about 15% and about 25% by weight of zinc sulfate. The backfill may comprise between 1% and about 40% by weight of lithium acetate. The backfill may comprise between about 5% and about 25% by weight of lithium acetate. The backfill may comprise between about 7% and about 15% by weight of lithium acetate.

The backfill may further comprise a gelling agent. The gelling agent may be agar or gelatin. The backfill may comprise between about 1% and about 5% by weight of the gelling agent.

The probe may further comprise a coupon fabricated of a conductive material, the coupon being disposed on an exterior of the body and being isolated from direct electrical contact with the reference electrode. The coupon may be fabricated of steel or cast iron.

In another aspect, there is provided a backfill composition for a probe configured to measure a cathodic protection condition of a buried steel structure, the backfill composition comprising at least one of: zinc sulfate ($ZnSO_4$); and lithium acetate.

BRIEF DESCRIPTION OF THE DRAWINGS

Embodiments will now be described more fully with reference to the accompanying drawings in which.

DETAILED DESCRIPTION OF EMBODIMENTS

Figure 1:
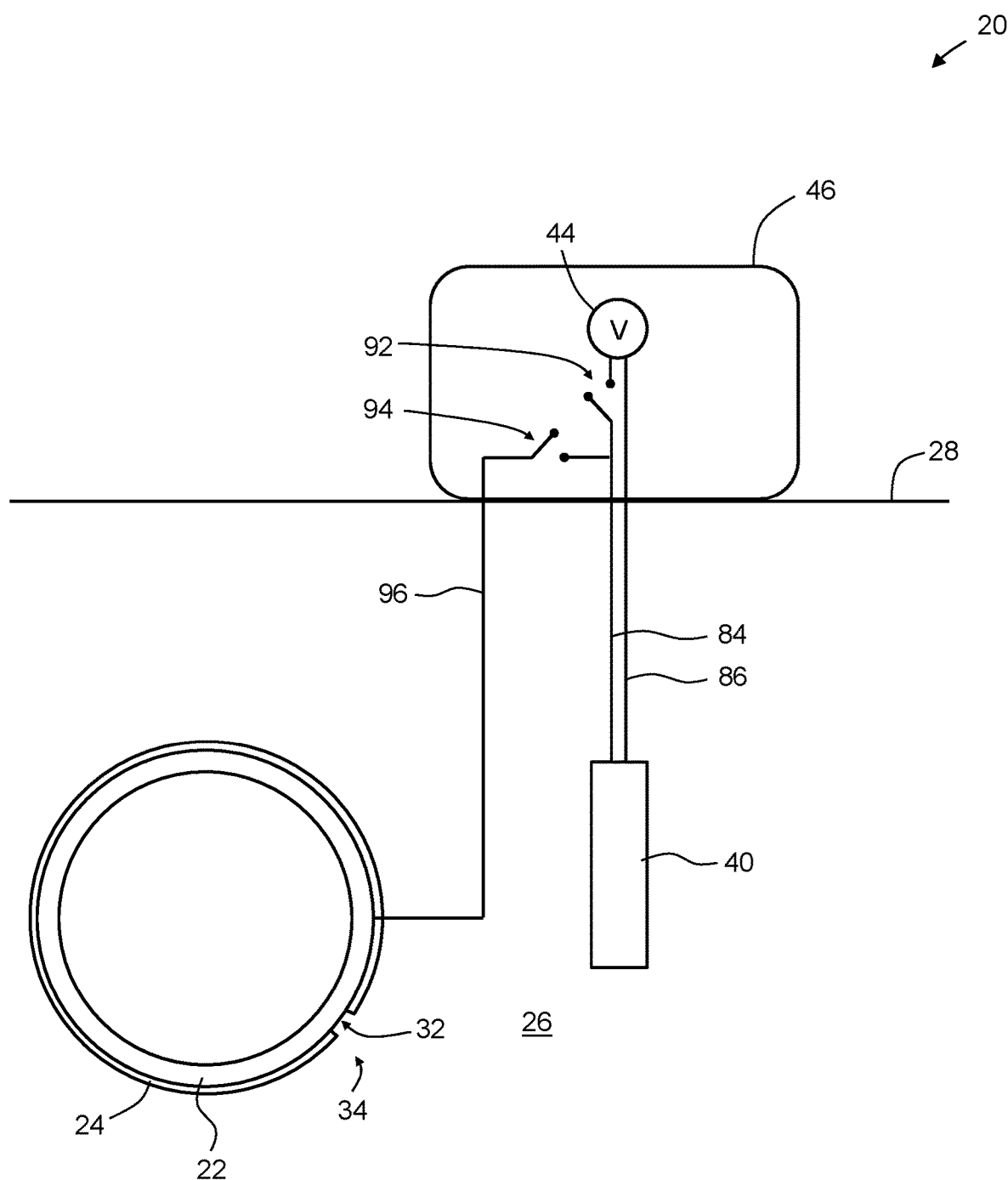
FIG. 1 is a schematic view of an apparatus for measuring a cathodic protection condition of a buried steel structure.

The foregoing summary, as well as the following detailed description of certain examples will be better understood when read in conjunction with the appended drawings. As used herein, an element or feature introduced in the singular and preceded by the word "a" or "an" should be understood as not necessarily excluding the plural of the elements or features. Further, references to "one example" or "one embodiment" are not intended to be interpreted as excluding the existence of additional examples or embodiments that also incorporate the described elements or features. Reference herein to "example" means that one or more feature, structure, element, component, characteristic and/or operational step described in connection with the example is included in at least one embodiment and/or implementation of the subject matter according to the subject disclosure. Thus, the phrases "an example," "another example" and similar language throughout the subject disclosure may, but do not necessarily, refer to the same example. Further, the subject matter characterizing any one example may, but does not necessarily, include the subject matter characterizing any other example.

Unless explicitly stated to the contrary, examples or embodiments "comprising" or "having" or "including" an element or feature or a plurality of elements or features having a particular property may include additional elements or features not having that property. Also, it will be appreciated that the terms "comprises", "has", "includes" means "including but not limited to" and the terms "comprising", "having" and "including" have equivalent meanings.

As used herein, the term "and/or" can include any and all combinations of one or more of the associated listed elements or features.

It will be understood that when an element or feature is referred to as being "on", "attached" to, "affixed" to, "connected" to, "coupled" with, "contacting", etc. another element or feature, that element or feature can be directly on, attached to, connected to, coupled with or contacting the other element or feature or intervening elements may also be present. In contrast, when an element or feature is referred to as being, for example, "directly on", "directly attached" to, "directly affixed" to, "directly connected" to, "directly coupled" with or "directly contacting" another element of feature, there are no intervening elements or features present.

It will be understood that spatially relative terms, such as "under", "below", "lower", "over", "above", "upper", "front", "back" and the like, may be used herein for ease of description to describe the relationship of an element or feature to another element or feature as illustrated in the figures. The spatially relative terms can however, encompass different orientations in use or operation in addition to the orientation depicted in the figures.

Reference herein to "configured" denotes an actual state of configuration that fundamentally ties the element or feature to the physical characteristics of the element or feature preceding the phrase "configured to."

Unless otherwise indicated, the terms "first," "second," etc. are used herein merely as labels, and are not intended to impose ordinal, positional, or hierarchical requirements on the items to which these terms refer. Moreover, reference to a "second" item does not require or preclude the existence of a lower-numbered item (e.g., a "first" item) and/or a higher-numbered item (e.g., a "third" item).

As used herein, the terms "approximately" and "about" represent an amount close to the stated amount that still performs the desired function or achieves the desired result. For example, the terms "approximately" and "about" may refer to an amount that is within engineering tolerances that would be readily appreciated by a person skilled in the art.

Turning now to FIG. 1, an apparatus for measuring a cathodic protection condition of a buried steel structure is shown, and is generally indicated using reference numeral 20. In particular, the apparatus 20 is configured to measure the cathodic protection condition of a buried steel structure 22 that is being cathodically protected by an impressed current cathodic protection (ICCP) device (not shown). In the example shown, the buried steel structure 22 is a pipeline covered with a polymer coating 24, and is buried in soil 26 below grade 28. The buried steel structure 22 has an exterior surface 32 that is exposed to soil 26 at a coating defect 34, which is in the form of a hole in the polymer coating 24. It will be understood however that the apparatus 20 is not limited to use with pipelines, and may alternatively be used with other buried steel structures, or with underwater structures, that are being cathodically protected by either an ICCP device or a galvanic cathodic protection arrangement.

The apparatus 20 comprises a probe 40 that is permanently buried in soil 26 adjacent the steel structure 22. The probe 40 is in electrical communication with a potential difference measurement device 44 housed in an enclosure 46 that is situated on grade 28 near the steel structure 22. The enclosure 46 and the potential difference measurement device 44 therein are accessible to workers, and in the example shown, the potential difference measurement device 44 is a voltmeter.

Figure 2:
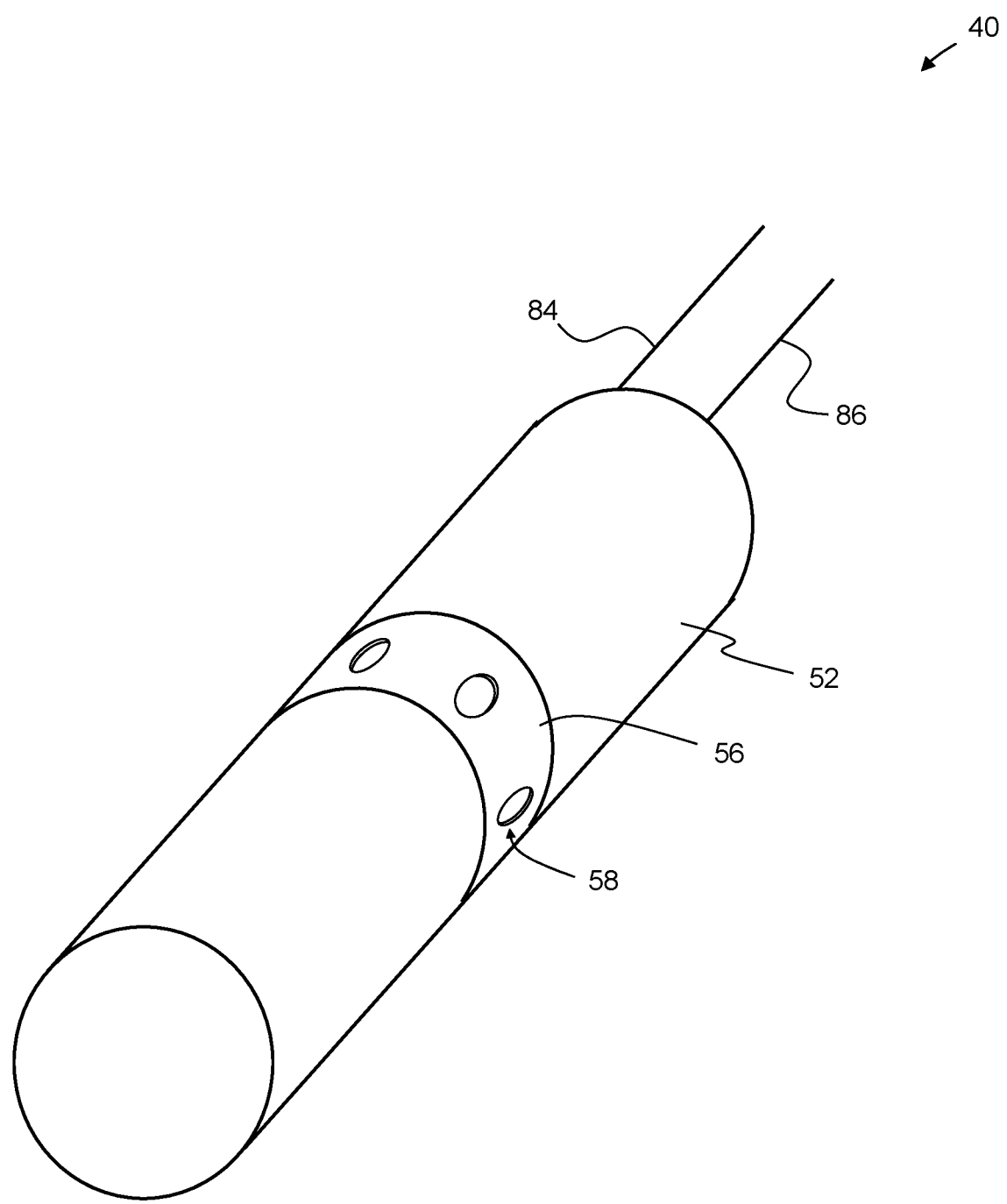
FIG. 2 is a perspective view of a probe forming part of the apparatus of FIG. 1.
Figure 3:
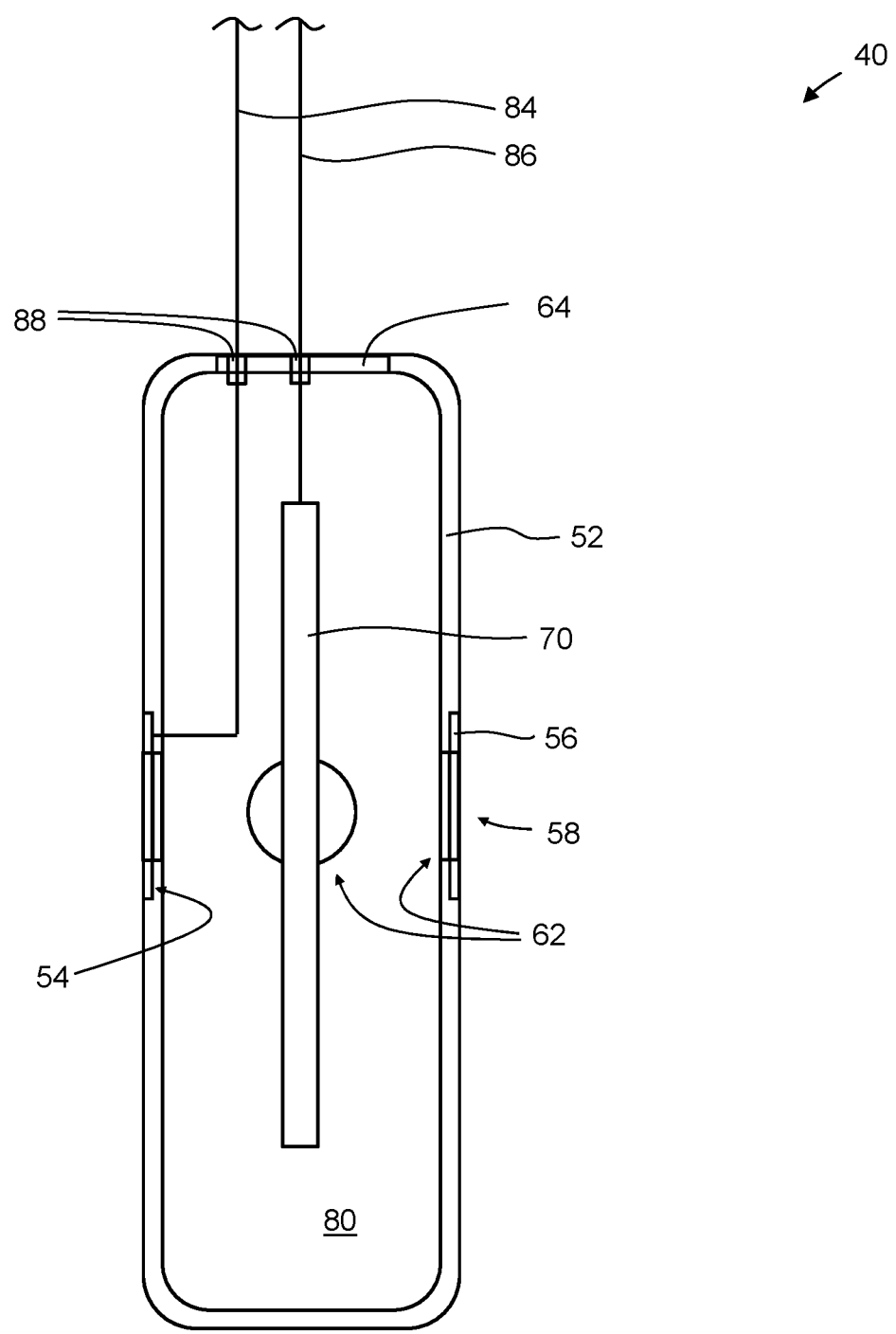
FIG. 3 is a sectional view of the probe of FIG. 2.

The probe 40 may be better seen in FIGS. 2 and 3. Probe 40 comprises an elongate, hollow body 52 that is fabricated of a non-conductive material, and in this embodiment the body 52 is fabricated of polyvinyl chloride (PVC). The body 52 has a shallow recess 54 formed around its outer surface, which accommodates a steel coupon 56 in the form of a cylindrical sleeve. The steel coupon 56 has one or more apertures 58 formed therein, which are each aligned with an aperture 62 formed through the wall of the body 52. Although not shown in FIGS. 2 and 3, each pair of apertures 58 and 62 may be plugged with a piece of material, such as felt (not shown) or porous ceramic (not shown), that provides electrolytic communication between the interior of the body 52 and soil surrounding the probe. The steel coupon 56 is sized to provide an exterior surface having an area that is generally commensurate with the area of a typical coating defect on the surface of the steel structure 22, such as coating defect 34. The body 52 is closed at a first end, and is sealed at a second end by a plug 64 fabricated of a non-conductive material.

The probe 40 further comprises a reference electrode 70 positioned in the interior of the body 52, away from direct electrical contact with the steel coupon 56. In this embodiment, the reference electrode 70 is in the form of a zinc (Zn) "pseudo reference" electrode.

The interior of the body 52 is filled with an ionically conductive backfill 80, which surrounds the reference electrode 70 and which is in electrolytic communication with the soil 26 surrounding the probe 40 via the one or more apertures 58 formed in the steel coupon 56. The ionically conductive backfill 80 comprises a plurality of components that are granular or pulverized, with the components comprising at least one of zinc sulfate ($ZnSO_4$) and lithium acetate. The inventors have discovered that the presence of at least one of zinc sulfate ($ZnSO_4$) and lithium acetate in the backfill prevents, or reduces the tendency of, the surface of the zinc electrode to passivate. In this embodiment, ionically conductive backfill 80 comprises bentonite, gypsum, zinc sulfate ($ZnSO_4$) and lithium acetate.

Preferably, the backfill 80 comprises between 0% and about 40% by weight of zinc sulfate. More preferably, the backfill 80 comprises between about 10% and about 30% by weight of zinc sulfate, and still more preferably between about 15% and about 25% by weight of zinc sulfate. Preferably, the backfill 80 comprises between 0% and about 40% by weight of lithium acetate. More preferably, the backfill 80 comprises between about 5% and about 25% by weight of lithium acetate, and still more preferably between about 7% and about 15% by weight of lithium acetate.

In this embodiment, the backfill 80 also comprises a gelling agent in the form of granular or pulverized gel which, without being bound by theory, improves moisture retention and thereby reduces the rate of drying of the backfill 80. The gelling agent may be, for example, any of agar, gelatin, and the like, in pulverized form. Preferably, the backfill 80 comprises between 0% and about 10% by weight of gelling agent. More preferably, the backfill 80 comprises between about 1% and about 7% by weight of gelling agent, and still more preferably between about 1% and about 5% by weight of gelling agent.

The probe 40 has an insulated first wire 84 that is electrically connected to the steel coupon 56 through the wall of the body 52, and an insulated second wire 86 that is electrically connected to the reference electrode 70. In the example shown, each of the first wire 84 and the second wire 86 extends out of the probe 40 through a sealed fitting 88 in the plug 64.

The potential difference measurement device 44 is in direct electrical communication with the reference electrode 70 via the second wire 86 extending from the probe 40. The potential difference measurement device 44 is in electrical communication with the steel coupon 56 via a first interruptible element 92, which is housed in the enclosure 46 and which is connected to the first wire 84.

The probe 40 is also in electrical communication with the steel structure 22 via a second interruptible element 94, which is housed in the enclosure 46 and which is connected to an insulated third wire 96 connected to the surface 32 of the steel structure 22 through the polymer coating 24.

In the example shown, each of the first interruptible element 92 and the second interruptible element 94 is a manually-operated switch. However, it will be appreciated that one or both of the first interruptible element 92 and the second interruptible element 94 may alternatively be a remotely-operated switch or an automated switch, and may for example be in the form of an electronic relay.

In use, when the probe 40 is not being used for measurement, the apparatus 20 is placed into a "non-measurement" configuration, whereby the first interruptible element 92 is opened, and the second interruptible element 94 is closed. In this configuration, the steel coupon 56 of the probe 40 is in electrical communication with the steel structure 22, which allows cathodic protection current being applied to the steel structure 22 by the ICCP device to flow to the steel coupon 56. As will be understood, the cathodic protection current alters the electrolytic conditions in the vicinity of the probe 40, and thereby creates an electrolytic environment in the vicinity of the steel coupon that mimics the electrolytic environment at the interface between the surface 32 of the steel structure 22 and soil 26 at the coating defect 34.

When the probe 40 is used for measurement, the apparatus 20 is placed into a "measurement" configuration, whereby the second interruptible element 94 is opened and the first interruptible element 92 is closed. In this configuration, the potential difference measurement device 44 is configured to measure the potential difference between the steel coupon 56 and the reference electrode 70, Es. The measured potential difference Es can be directly compared to one or more industry standards to determine cathodic protection effectiveness of the buried steel structure 22.

As will be appreciated, the presence of at least one of zinc sulfate ($ZnSO_4$) and lithium acetate in the backfill advantageously prevents or reduces the tendency of the surface of the zinc electrode to passivate. As will be understood, passivation of the zinc electrode involves formation of a layer of zinc oxide on the surface of the zinc electrode, which would otherwise cause the electrical potential of zinc to drift to an unknown and unpredictable value over time, thereby yielding an instability in electrical potential measurements over time. As will be appreciated, preventing or reducing the tendency of the surface of the zinc electrode to passivate advantageously allows the probe to provide electrical potential measurements having greater accuracy and greater stability over time as compared to conventional probes.

Figure 4:
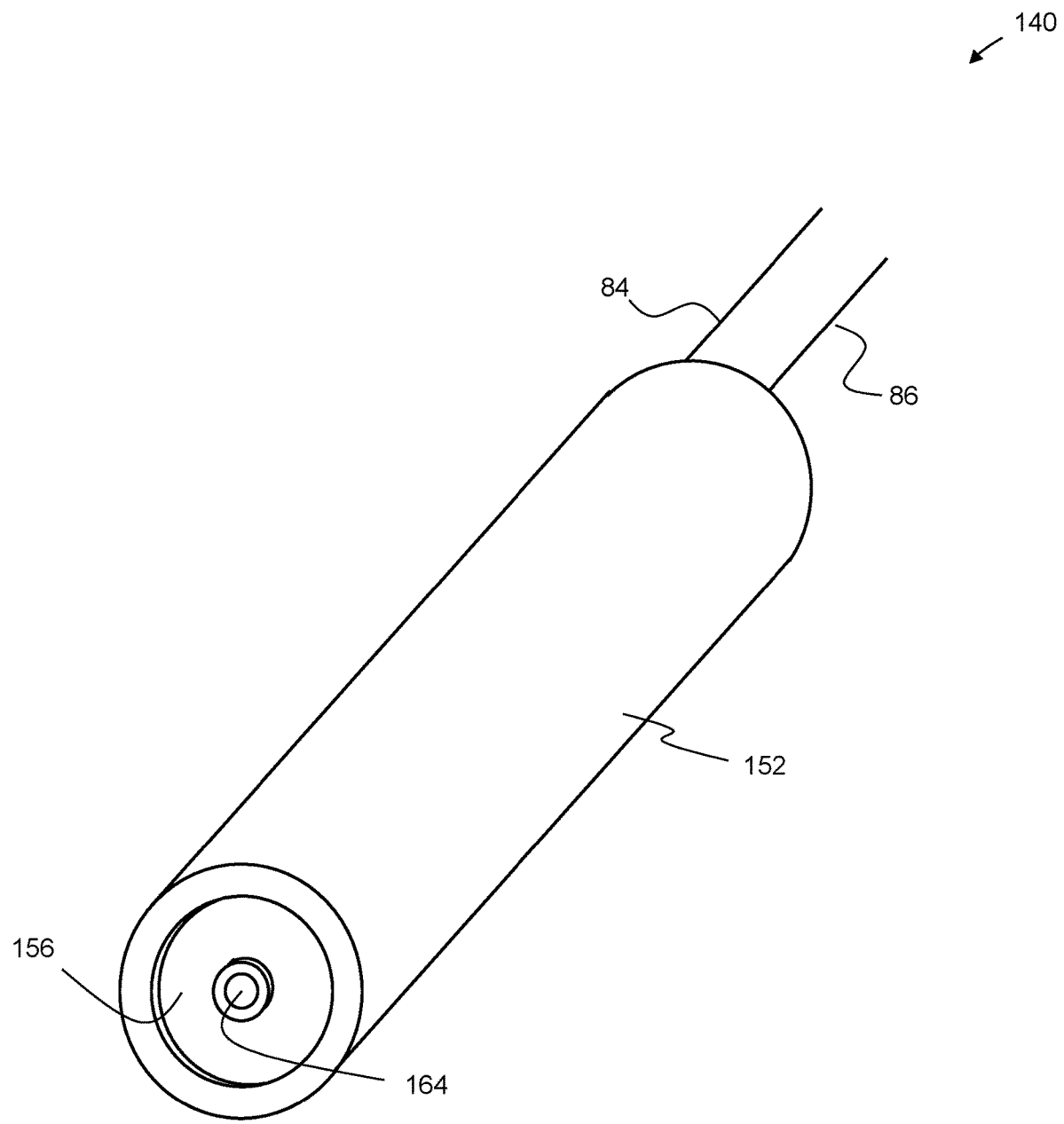
FIG. 4 is a perspective view of another embodiment of a probe forming part of the apparatus of FIG. 1.
Figure 5:
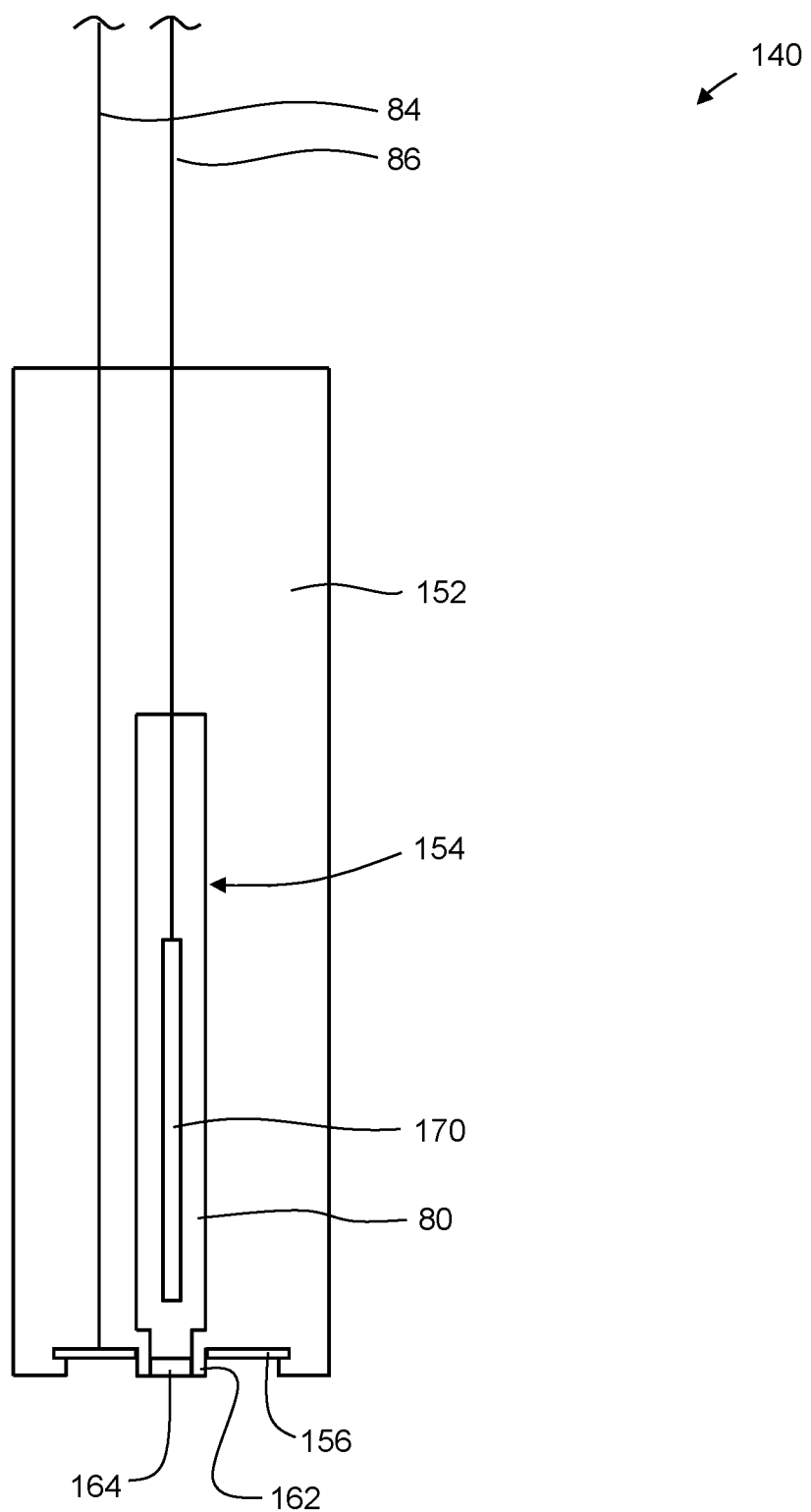
FIG. 5 is a sectional view of the probe of FIG. 4.

The probe is not limited to the configuration described above, and in other embodiments, the probe may be differently configured. For example, FIGS. 4 and 5 show another embodiment of a probe for use with the apparatus 20, and which is generally indicated by reference numeral 140. Probe 140 is similar to probe 40 described above, and comprises a generally cylindrical body 152 that is fabricated of a non-conductive material, and in this embodiment the body 152 is fabricated of polyurethane. The body 152 defines an elongate inner cavity 154 that extends towards a first end 156 of the body 152. A recessed, disc-shaped slot is formed at the first end of the body 152, and accommodates a steel coupon 156. The steel coupon 156 has an aperture formed therein that receives a tubular projection 162 extending from the inner cavity 154. The tubular projection 162 accommodates a plug 164 fabricated of a porous material that provides electrolytic communication between the inner cavity 154 and the soil surrounding the probe, and in this embodiment the plug is fabricated of porous ceramic. As will be understood, the steel coupon 156 is sized to provide an exterior surface having an area that is generally commensurate with the area of a typical coating defect on the surface of the steel structure 22, such as coating defect 34.

The probe 140 further comprises a reference electrode 170 positioned in the interior of the inner cavity 154 of the body 152, away from direct electrical contact with the steel coupon 156. In this embodiment, the reference electrode 170 is in the form of a zinc (Zn) "pseudo reference" electrode. The inner cavity 154 of the body 152 is filled with the ionically conductive backfill 80, which surrounds the reference electrode 170 and which is in electrolytic communication with the soil 26 surrounding the probe 40 via the aperture 156 formed in the steel coupon 156. The ionically conductive backfill 80 comprises a plurality of components that are granular or pulverized, with the components comprising at least one of zinc sulfate ($ZnSO_4$) and lithium acetate. In this embodiment, ionically conductive backfill 80 is a blend of bentonite, gypsum, zinc sulfate ($ZnSO_4$), lithium acetate and agar.

The probe 140 has an insulated first wire 84 that is electrically connected to the steel coupon 156 through the body 152, and an insulated second wire 86 that is electrically connected to the reference electrode 170. Each of the first wire 84 and the second wire 86 extends out of the probe 140.

Although in the embodiment described above, the reference electrode is in the form of a zinc (Zn) "pseudo reference" electrode, in other embodiments, the reference electrode may alternatively be any of a copper-copper sulfate electrode (CSE), a saturated calomel electrode (SCE), a silver-silver chloride electrode, and the like.

Figure 6:
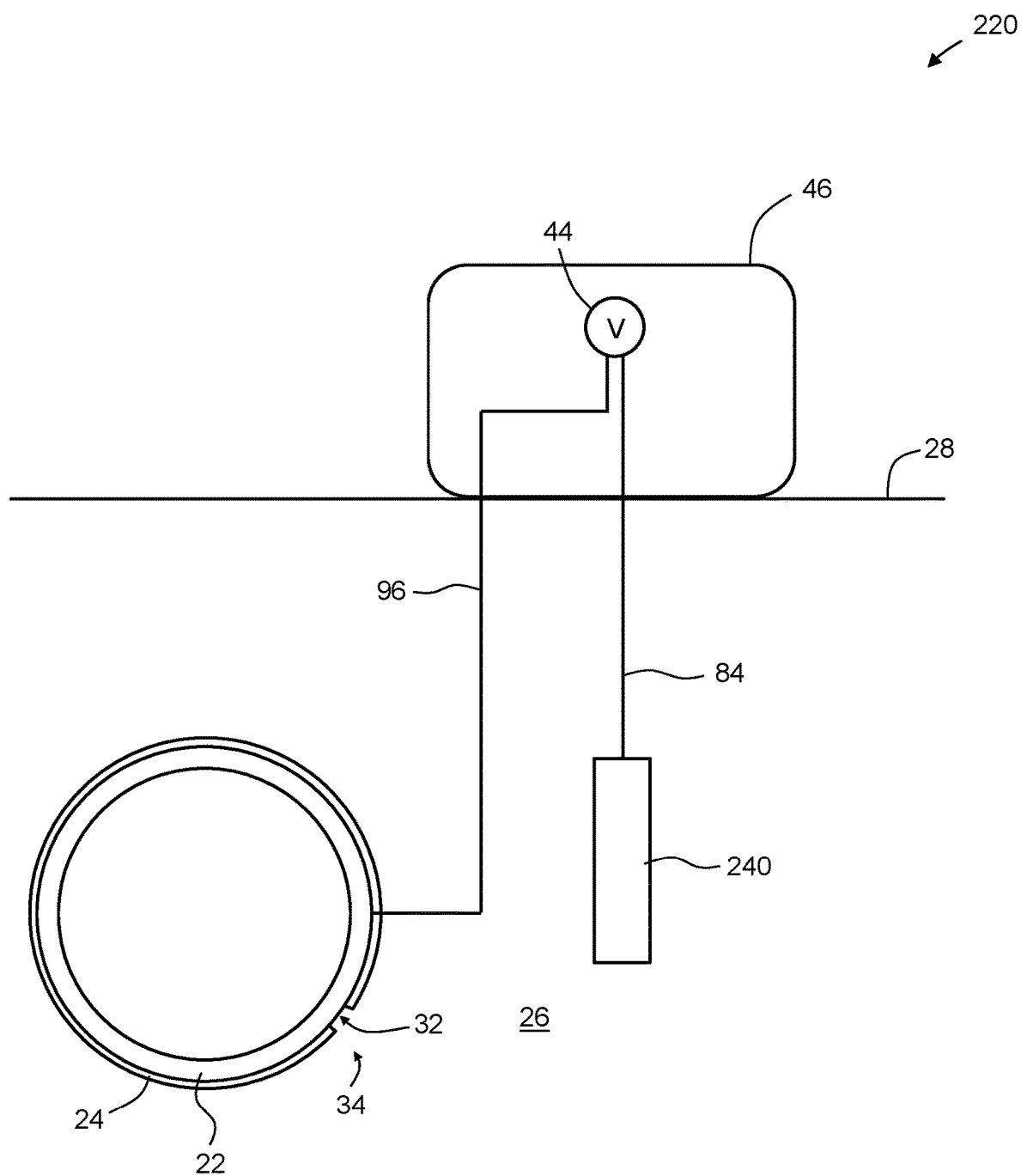
FIG. 6 is a schematic view of another apparatus for measuring a cathodic protection condition of a buried steel structure.

Still other configurations are possible. For example, FIG. 6 shows another embodiment of an apparatus for measuring a cathodic protection condition of a buried steel structure, and which is generally indicated using reference numeral 220. In particular, the apparatus 220 is configured to measure the cathodic protection condition of a buried steel structure 22 that is being cathodically protected by an impressed current cathodic protection (ICCP) device (not shown). In the example shown, the buried steel structure 22 is a pipeline covered with a polymer coating 24, and is buried in soil 26 below grade 28. The buried steel structure 22 has an exterior surface 32 that is exposed to soil 26 at a coating defect 34, which is in the form of a hole in the polymer coating 24. It will be understood however that the apparatus 220 is not limited to use with pipelines, and may alternatively be used with other buried steel structures, or with underwater structures, that are being cathodically protected by either an ICCP device or a galvanic cathodic protection arrangement.

The apparatus 220 comprises a probe 240 that is permanently buried in soil 26 adjacent the steel structure 22. The probe 240 is in electrical communication with a potential difference measurement device 44 housed in an enclosure 46 that is situated on grade 28 near the steel structure 22. The enclosure 46 and the potential difference measurement device 44 therein are accessible to workers, and in the example shown, the potential difference measurement device 44 is a voltmeter.

Figure 7:
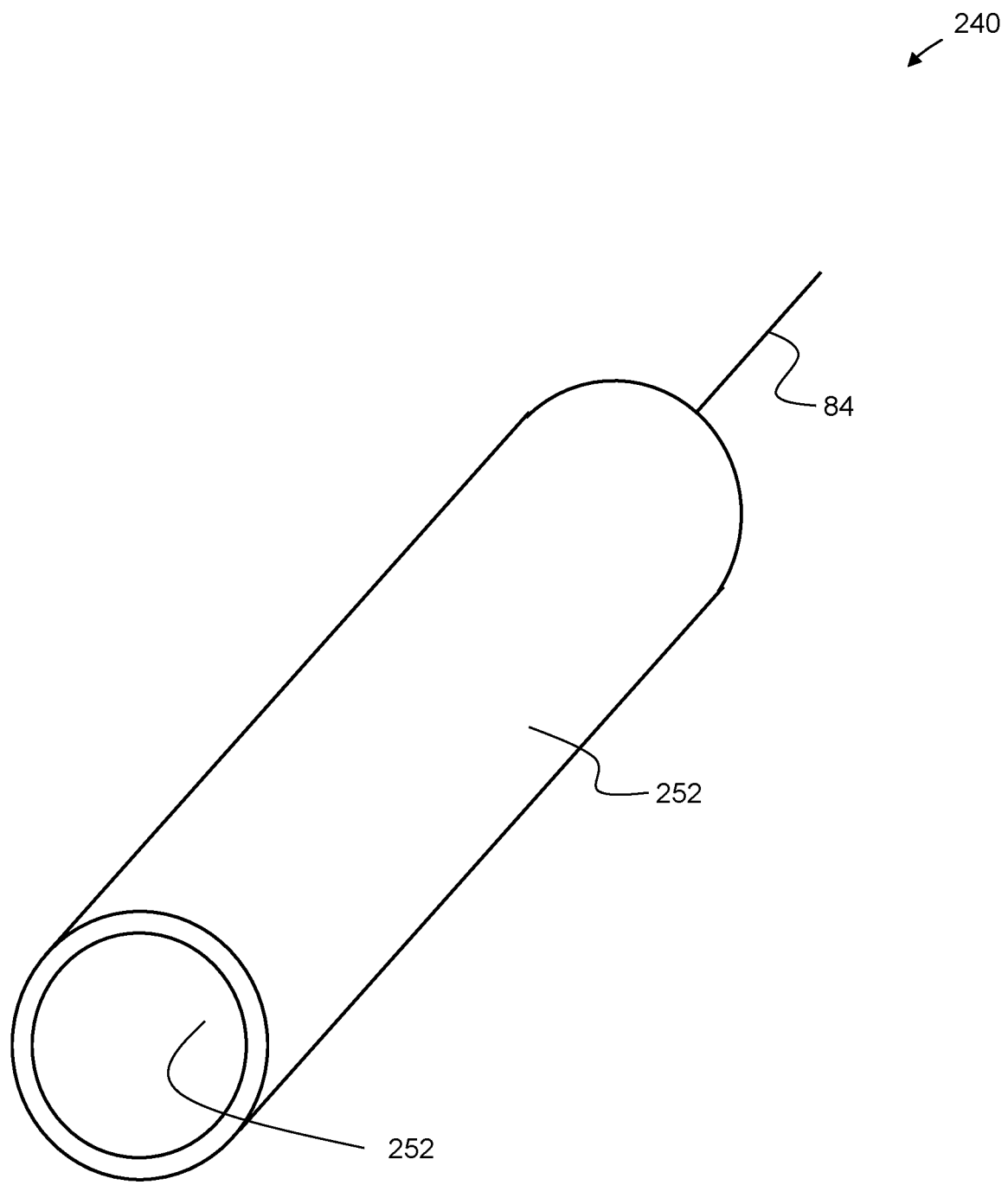
FIG. 7 is a perspective view of a probe forming part of the apparatus of FIG. 6.
Figure 8:
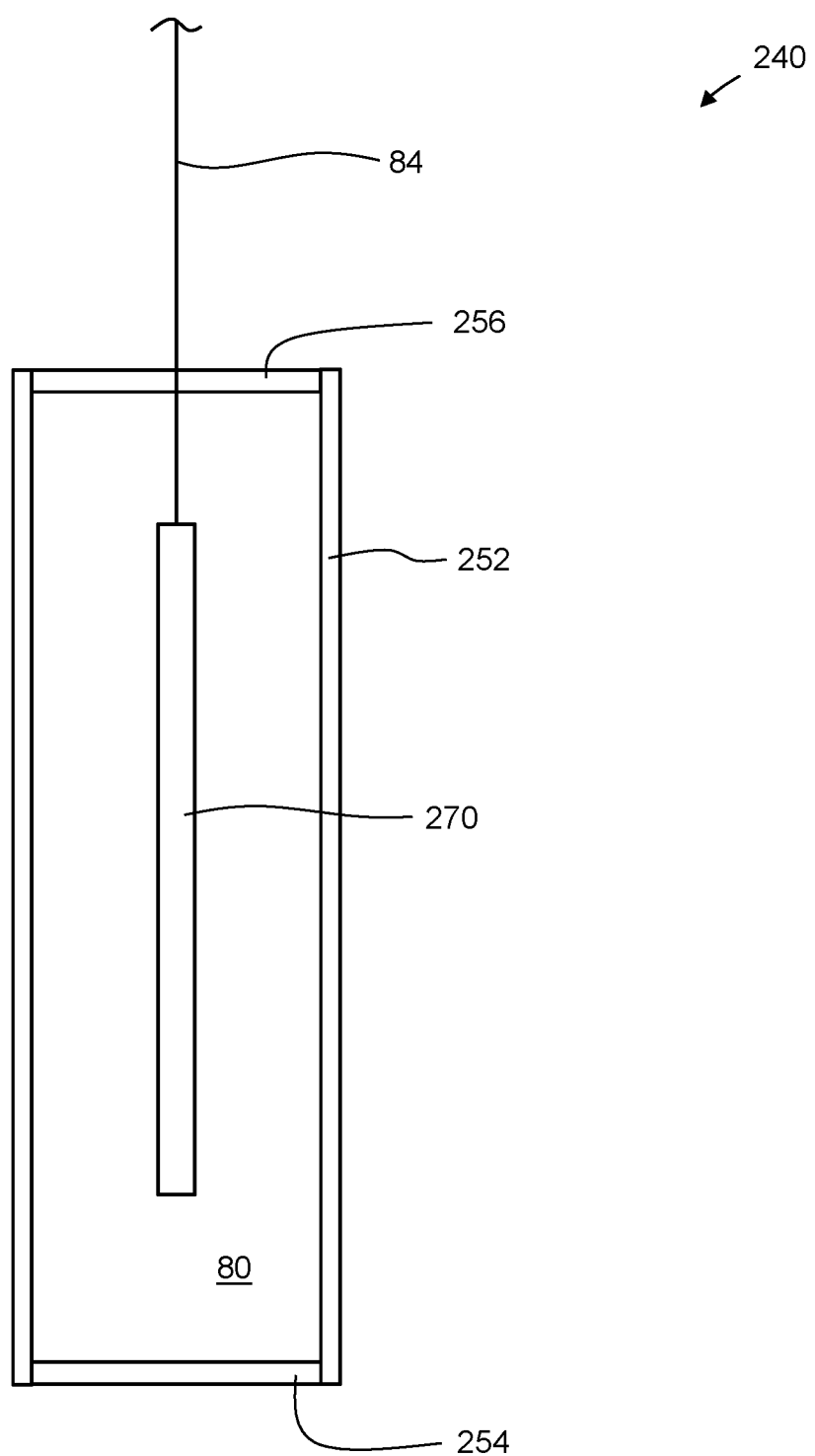
FIG. 8 is a sectional view of the probe of FIG. 7.

The probe 240 may be better seen in FIGS. 7 and 8. Probe 240 comprises an elongate, hollow body 252 that is fabricated of an electrolytically conductive material, and in this embodiment the body 252 is fabricated of cardboard. The body 252 has a first end that is closed by a cap 254 fabricated of a non-conductive material, and a second end that is closed by a cap 256 fabricated of a non-conductive material. In the example shown, the cap 254 is fabricated of a polymer, such as one of polyvinyl chloride (PVC), polyurethane, and the like.

The probe 240 further comprises a reference electrode 270 positioned in the interior of the body 252. In this embodiment, the reference electrode 270 is in the form of a zinc (Zn) "pseudo reference" electrode. The interior of the body 252 is filled with the ionically conductive backfill 80, which surrounds the reference electrode 270 and which is in electrolytic communication with the soil 26 surrounding the probe 240 through the hollow body 252. The ionically conductive backfill 80 comprises a plurality of components that are granular or pulverized, with the components comprising at least one of zinc sulfate ($ZnSO_4$) and lithium acetate. In this embodiment, ionically conductive backfill 80 is a blend of bentonite, gypsum, zinc sulfate ($ZnSO_4$), lithium acetate and agar.

The probe 240 has an insulated first wire 84 that is electrically connected to the reference electrode 270. The first wire 84 extends out of the probe 240 through an aperture in the cap 256.

The potential difference measurement device 44 is in direct electrical communication with the reference electrode 270 via the first wire 84 extending from the probe 240. The potential difference measurement device 44 is also in direct electrical communication with the steel structure 22 via an insulated second wire 96 connected to the surface 32 of the steel structure 22 through the polymer coating 24.

In use, the potential difference measurement device 44 is configured to measure the potential difference between the reference electrode 270 and the steel structure 22, Ec. The measured potential difference Ec can be used to calculate a relative potential difference Ec CSE, such as by subtracting a conversion factor, which can in turn be directly compared to one or more industry standards to determine cathodic protection effectiveness of the buried steel structure 22.

Although in the embodiment described above, the probe 240 comprises an elongate, hollow body 252 that is fabricated of fabricated of cardboard, in other embodiments, the body of the probe may alternatively be fabricated of another material that is suitably electrolytically conductive. For example, the body of the probe may alternatively be in the form of a pouch and fabricated of a cloth or a woven material, such as cotton fabric. Other suitable materials may alternatively be used for the pouch. In still other embodiments, the body of the probe may be another shape suitable for accommodating the reference electrode and the ionically conductive backfill.

Still other configurations are possible. For example, although in the embodiments described above, the potential difference measurement device 44 is housed in the enclosure 46 that is situated on grade 28 near the steel structure 22, in other embodiments, the potential difference measurement device may alternatively be a portable, hand-held potential difference measurement device, such as a portable multimeter, for example. Additionally, although in the embodiments described above, ends of the wires (such as wires 84, 86 and 96) are located within the enclosure 46, in other embodiments the ends of one or more of wires 84, 86 and 96 may alternatively be located elsewhere above grade 28, or alternatively may otherwise be accessible below grade.

Although in the embodiments described above, the backfill 80 comprises bentonite and gypsum, in other embodiments, the backfill may alternatively comprise only one (1) of bentonite and gypsum, or neither bentonite nor gypsum, and may alternatively comprise one or more other suitable materials. It will be appreciated that bentonite generally serves as a filler material in the backfill, while gypsum serves as both a filler and as a source of ions that play a role in preventing or reducing the tendency of the surface of the zinc electrode to passivate, albeit a less effective role than the zinc sulfate and/or lithium acetate.

Although in the embodiments described above, the backfill 80 comprises a gelling agent in the form of granular or pulverized gel, in other embodiments, the backfill may alternatively comprise no gelling agent.

The following example illustrates an application of the above-described embodiment.

Example 1

In this example, relative potential measurements were carried out for a zinc (Zn) electrode immersed in backfill having different compositions. The zinc electrode and backfill were contained in a cloth sleeve, which was secured at both ends to define a closed pouch containing the electrode and the backfill. An insulated wire, electrically connected to the zinc electrode, extended from an end of the pouch. The pouch was buried in a bed of sand. A copper-copper sulfate reference electrode, having an insulated wire electrically connected thereto, was also buried in the bed of sand. The wires were connected to a data acquisition module, which measured the potential of the zinc electrode relative to the reference electrode over a time period of several weeks.

The backfill compositions used are shown in Table 1:

TABLE 1

| Sample | Backfill Composition | | |
|---|---|---|---|
| A0 | Gypsum 75% | Bentonite 25% | |
| A1 | Gypsum 75% | Bentonite 20% | Sodium sulfate 5% |
| A2 | Gypsum 75% | Bentonite 20% | Zinc sulfate 5% |
| A3 | Gypsum 75% | Bentonite 20% | Sodium chloride 5% |
| A4 | Gypsum 75% | Bentonite 20% | Lithium acetate 5% |
| A5 | Gypsum 75% | Bentonite 20% | Potassium silicate 5% |
| A6 | Gypsum 75% | Bentonite 20% | Potassium acetate 5% |

Figure 9:
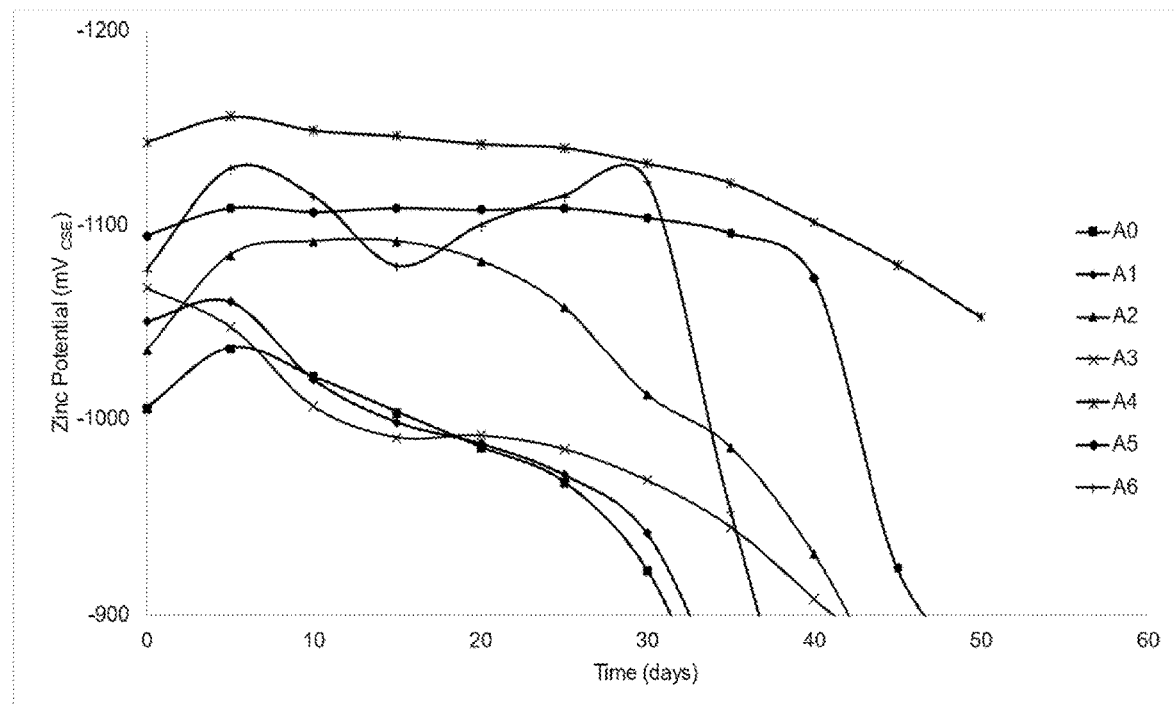
FIG. 9 is a graphical plot of measured potential as a function of time for an exemplary probe, having backfill of various compositions comprising gypsum and bentonite.

FIG. 9 is a graphical plot of the measured potential of the Zn electrode relative to the reference electrode as a function of time for each of the backfill compositions shown in Table 1. As can be seen, the backfill composition comprising only gypsum and bentonite (sample A0) yielded the largest initial potential (i.e. the potential at time=0 days), and the value of the potential increased the most quickly of all the samples. In contrast, the backfill composition comprising lithium acetate (sample A4) yielded the smallest initial potential, and increased the least quickly of all the samples. These results indicate that the presence of lithium acetate in the backfill improves the stability of the Zn electrode over time, and that lithium acetate has a greater effect on Zn electrode stability than equal amounts of the other components tested, namely sodium sulfate, zinc sulfate, sodium chloride, potassium silicate and potassium acetate.

Example 2

In this example, relative potential measurements were carried out for a zinc (Zn) electrode immersed in backfill comprising different amounts of gypsum, bentonite and zinc sulfate. Similar to the experimental set-up used for Example 1, the zinc electrode and backfill were contained in a cloth sleeve, which was secured at both ends to define a closed pouch containing the electrode and the backfill. An insulated wire, electrically connected to the zinc electrode, extended from an end of the pouch. The pouch was buried in a bed of sand. A copper-copper sulfate reference electrode, having an insulated wire electrically connected thereto, was also buried in the bed of sand. The wires were connected to a data acquisition module, which measured the potential of the zinc electrode relative to the reference electrode over a time period of several weeks.

The backfill compositions used are shown in Table 2:

TABLE 2

| | Backfill Composition | | |
|---|---|---|---|
| Sample | Gypsum (%) | Bentonite (%) | Zinc sulfate (%) |
| B0 | 80 | 20 | 0 |
| B1 | 75 | 20 | 5 |
| B2 | 70 | 20 | 10 |

TABLE 2-continued

| | Backfill Composition | | |
|---|---|---|---|
| Sample | Gypsum (%) | Bentonite (%) | Zinc sulfate (%) |
| B3 | 65 | 20 | 15 |
| B4 | 60 | 20 | 20 |
| B5 | 55 | 20 | 25 |
| B6 | 50 | 20 | 30 |
| B7 | 40 | 20 | 40 |

Figure 10:
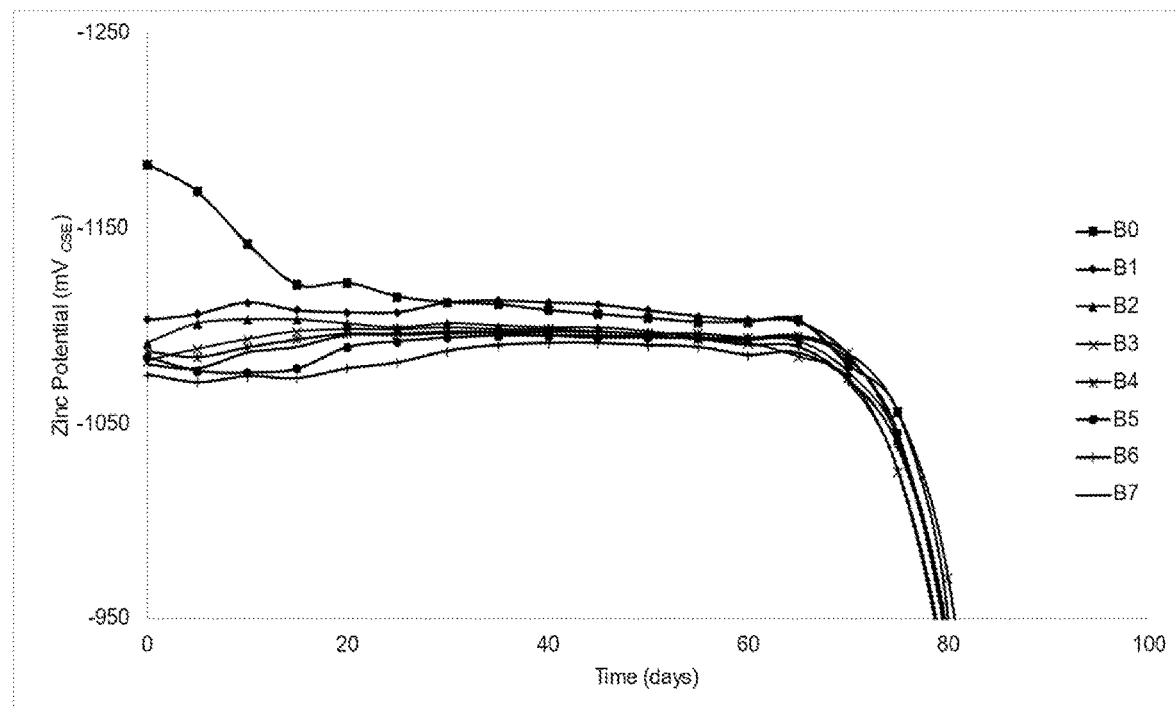
FIG. 10 is a graphical plot of measured potential as a function of time for an exemplary probe, having backfill of various compositions comprising gypsum, bentonite and zinc sulfate.

FIG. 10 is a graphical plot of the measured potential of the Zn electrode relative to the reference electrode as a function of time for each of the backfill compositions shown in Table 2. As can be seen, the backfill composition comprising 0% zinc sulfate (sample B0) yielded an instability in measured potential over time. Additionally, and as can be seen, the backfill composition comprising 5% zinc sulfate (sample B1) rendered the electrode more electronegative than backfill compositions comprising more than 5% zinc sulfate (samples B2 to B7), all of which yielded generally similar values of potential as a function of time. The instability observed for all samples at time >65 days is due to an increase in contact resistance caused by inadvertent drying of the sand bed, and is therefore not an artifact associated with any particular backfill composition.

Example 3

In this example, relative potential measurements were carried out for a zinc (Zn) electrode immersed in backfill comprising different amounts of gypsum, bentonite and lithium acetate. Similar to the experimental set-up used for Example 1, the zinc electrode and backfill were contained in a cloth sleeve, which was secured at both ends to define a closed pouch containing the electrode and the backfill. An insulated wire, electrically connected to the zinc electrode, extended from an end of the pouch. The pouch was buried in a bed of sand. A copper-copper sulfate reference electrode, having an insulated wire electrically connected thereto, was also buried in the bed of sand. The wires were connected to a data acquisition module, which measured the potential of the zinc electrode relative to the reference electrode over a time period of several weeks.

The backfill compositions used are shown in Table 3:

TABLE 3

| | Backfill Composition | | |
|---|---|---|---|
| Sample | Gypsum (%) | Bentonite (%) | Lithium acetate (%) |
| C0 | 80 | 20 | 0 |
| C1 | 75 | 20 | 5 |
| C2 | 70 | 20 | 10 |
| C3 | 65 | 20 | 15 |
| C4 | 60 | 20 | 20 |
| C5 | 55 | 20 | 25 |
| C6 | 50 | 20 | 30 |
| C7 | 40 | 20 | 40 |

Figure 11:
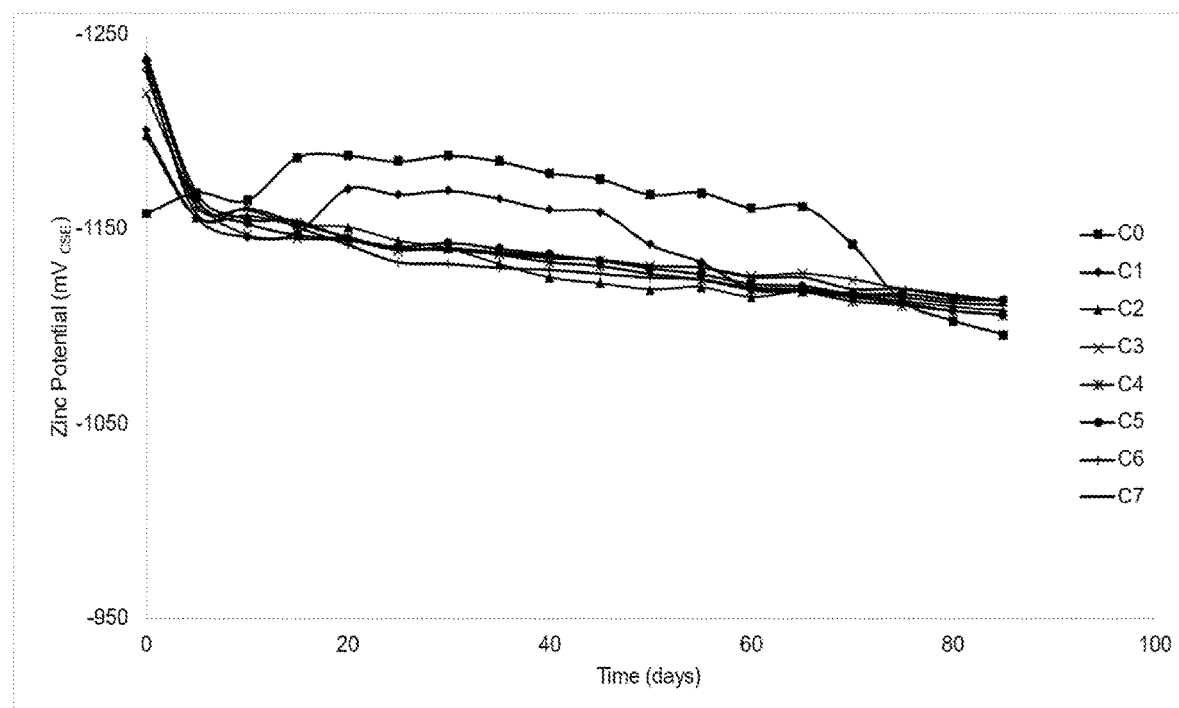
FIG. 11 is a graphical plot of measured potential as a function of time for an exemplary probe, having backfill of various compositions comprising gypsum, bentonite and lithium acetate.

FIG. 11 is a graphical plot of the measured potential of the Zn electrode relative to the reference electrode as a function of time for each of the backfill compositions shown in Table 3. As can be seen, backfill compositions having between 10% and 40% lithium acetate yielded potential-time curves having the greatest stability over the measurement time.

Example 4

In this example, relative potential measurements were carried out for a zinc (Zn) electrode immersed in backfill comprising gypsum, bentonite, zinc sulfate and lithium acetate. The zinc electrode and backfill were contained in a polyvinyl chloride (PVC) tube, with holes drilled into the side to allow for electrolytic communication. An insulated wire, electrically connected to the zinc electrode, extended from an end of the PVC tube. The PVC tube was buried in a bed of sand. A copper-copper sulfate reference electrode, having an insulated wire electrically connected thereto, was also buried in the bed of sand. The wires were connected to a data acquisition module, which measured the potential of the zinc electrode relative to the reference electrode over a time period of several weeks.

The backfill composition used fell within the ranges shown in Table 4:

TABLE 4

| | Backfill Composition | | | |
|---|---|---|---|---|
| Sample | Gypsum (%) | Bentonite (%) | Zinc sulfate (%) | Lithium acetate (%) |
| D1 | 25-45 | 25-45 | 15-25 | 7-15 |

Figure 12:
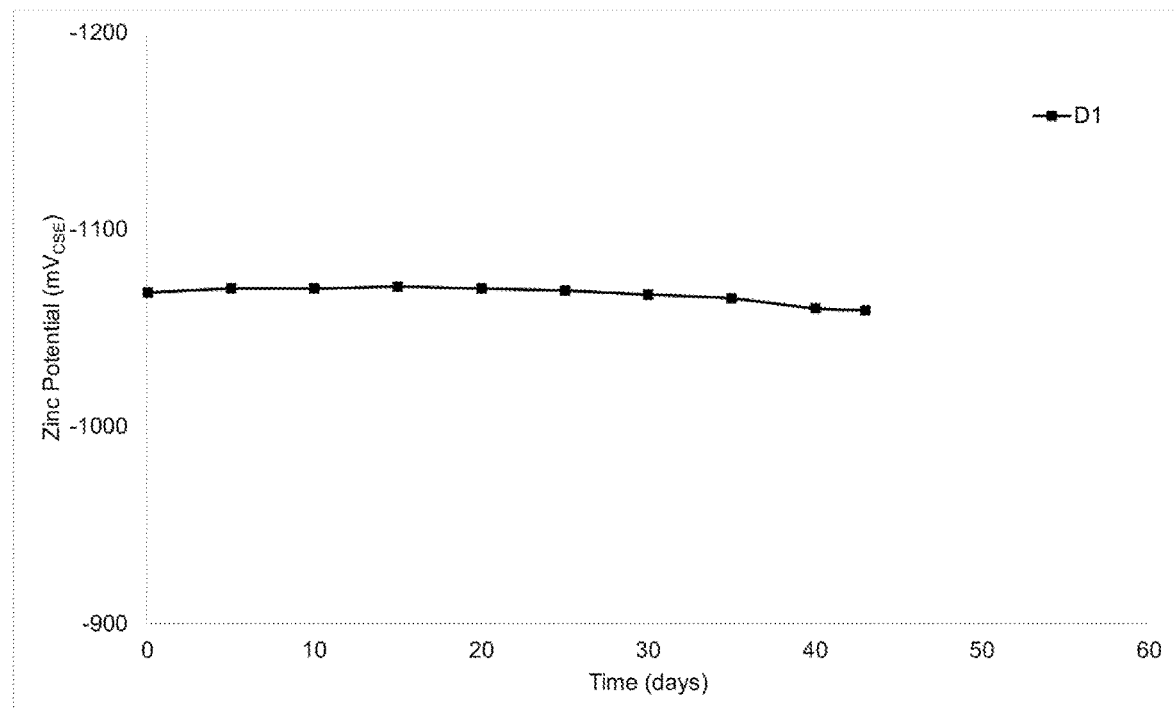
FIG. 12 is a graphical plot of measured potential as a function of time for an exemplary probe having a backfill comprising gypsum, bentonite, zinc sulfate and lithium acetate.

FIG. 12 is a graphical plot of the measured potential of the Zn electrode relative to the reference electrode as a function of time. As can be seen, the potential-time curve is nearly horizontal, indicating that this backfill composition and probe configuration had a significant and beneficial impact on Zn electrode stability.

Example 5

In this example, relative potential measurements were carried out for a zinc (Zn) electrode immersed in backfill comprising different amounts of gypsum, bentonite, zinc sulfate, lithium acetate and agar. Similar to the experimental set-up used for Example 4, the zinc electrode and backfill were contained in a polyvinyl chloride (PVC) tube, with holes drilled into the side to allow for electrolytic communication. An insulated wire, electrically connected to the zinc electrode, extended from an end of the PVC tube. The PVC tube was buried in a bed of sand. A copper-copper sulfate reference electrode, having an insulated wire electrically connected thereto, was also buried in the bed of sand. The wires were connected to a data acquisition module, which measured the potential of the zinc electrode relative to the reference electrode over a time period of several weeks.

Two (2) different methods were used to combine the agar with the other components of the backfill. In the first method, agar powder was dissolved in warm water, and the warm agar solution was allowed to cool to room temperature to form an agar gel. The agar gel was then pulverized and combined with the other components of the backfill to yield the compositions used shown in Table 5:

TABLE 5

| | Backfill Composition | | | | |
|---|---|---|---|---|---|
| Sample | Gypsum (%) | Bentonite (%) | Zinc sulfate (%) | Lithium acetate (%) | Agar (%) |
| D0 | 45 | 25 | 20 | 10 | 0 |
| D1 | 45 | 24 | 20 | 10 | 1 |
| D2 | 45 | 23 | 20 | 10 | 2 |

TABLE 5-continued

| | Backfill Composition | | | | |
|---|---|---|---|---|---|
| Sample | Gypsum (%) | Bentonite (%) | Zinc sulfate (%) | Lithium acetate (%) | Agar (%) |
| D3 | 45 | 22 | 20 | 10 | 3 |
| D4 | 45 | 21 | 20 | 10 | 4 |
| D5 | 45 | 20 | 20 | 10 | 5 |

In the second method, agar powder was dissolved in warm water, and the warm agar solution was then combined with the other components of the backfill (i.e. before being allowed to cool to room temperature to separately form the agar gel), to yield the compositions used shown in Table 6:

TABLE 6

| | Backfill Composition | | | | |
|---|---|---|---|---|---|
| Sample | Gypsum (%) | Bentonite (%) | Zinc sulfate (%) | Lithium acetate (%) | Agar (%) |
| E0 | 45 | 25 | 20 | 10 | 0 |
| E1 | 45 | 24 | 20 | 10 | 1 |
| E2 | 45 | 23 | 20 | 10 | 2 |
| E3 | 45 | 22 | 20 | 10 | 3 |
| E4 | 45 | 21 | 20 | 10 | 4 |
| E5 | 45 | 20 | 20 | 10 | 5 |

Figure 13:
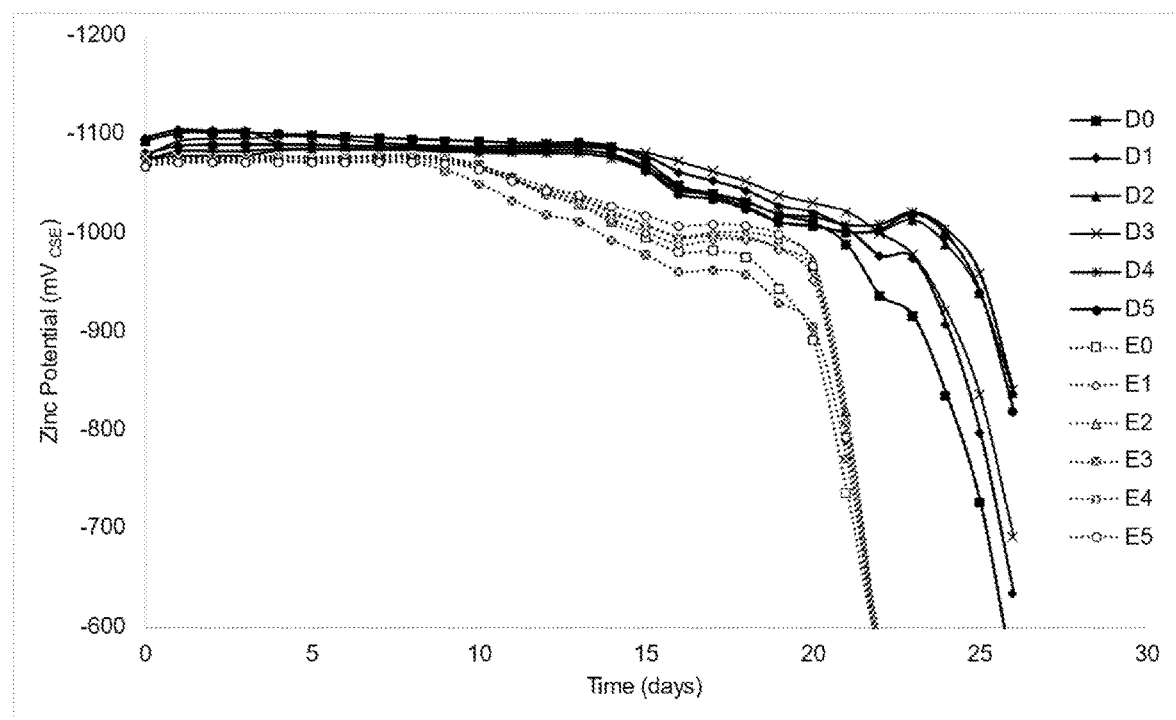
FIG. 13 is a graphical plot of measured potential as a function of time for an exemplary probe having a backfill of various compositions comprising gypsum, bentonite, zinc sulfate, lithium acetate and agar.

FIG. 13 is a graphical plot of the measured potential of the Zn electrode relative to the reference electrode as a function of time for each of the backfill compositions shown in Tables 5 and 6. As can be seen, although instability caused by deliberate drying of the backfill was observed at times >9 days for all samples, backfill compositions having at least some agar (samples D1 to D5 and samples E1 to E5) rendered the electrode more electronegative than backfill compositions having no agar (samples D0 and E0) over the duration of the measurement. Additionally, backfill compositions formed by combining agar gel with the other components (samples D1 to D5) exhibited drying instability at a later time (and therefore rendered the electrode more electronegative for a longer time) than backfill compositions formed by combining warm agar solution with the other components (samples E1 to E5).

Although embodiments have been described above with reference to the accompanying drawings, those of skill in the art will appreciate that variations and modifications may be made without departing from the scope thereof as defined by the appended claims.

What is claimed is:

1. A probe for measuring a cathodic protection condition of a buried steel structure, the probe comprising:
   a body;
   a reference electrode accommodated in an interior of the body; and
   a volume of backfill accommodated in the interior of the body and at least partially surrounding the reference electrode, the backfill comprising at least one of:
   zinc sulfate ($ZnSO_4$); and
   lithium acetate,
   wherein the backfill further comprises between about 0.1% and about 10% by weight of a gelling agent.

2. The probe of claim 1, wherein the backfill further comprises at least one of gypsum and bentonite.

3. The probe of claim 1, wherein the backfill comprises between about 0.25% and about 7% by weight of the gelling agent.

4. The probe of claim 1, wherein the gelling agent is agar or gelatin.

5. The probe of claim 1, wherein the backfill comprises between about 1% and about 5% by weight of the gelling agent.

6. The probe of claim 1, further comprising a coupon fabricated of a conductive material, the coupon being disposed on an exterior of the body and being isolated from direct electrical contact with the reference electrode.

7. The probe of claim 6, wherein the coupon is fabricated of steel or cast iron.

8. A probe for measuring a cathodic protection condition of a buried steel structure, the probe comprising:
   a body;
   a reference electrode accommodated in an interior of the body; and
   a volume of backfill accommodated in the interior of the body and at least partially surrounding the reference electrode, the backfill comprising at least one of:
   zinc sulfate ($ZnSO_4$); and
   lithium acetate,
   wherein the backfill comprises between 1% and about 40% by weight of zinc sulfate.

9. The probe of claim 8, wherein the backfill comprises between about 15% and about 25% by weight of zinc sulfate.

10. A probe for measuring a cathodic protection condition of a buried steel structure, the probe comprising:
    a body;
    a reference electrode accommodated in an interior of the body; and
    a volume of backfill accommodated in the interior of the body and at least partially surrounding the reference electrode, the backfill comprising at least one of:
    zinc sulfate ($ZnSO_4$); and
    lithium acetate,
    wherein the backfill comprises between 1% and about 40% by weight of lithium acetate.

11. The probe of claim 10, wherein the backfill comprises between about 7% and about 15% by weight of lithium acetate.

12. A backfill composition for a probe configured to measure a cathodic protection condition of a buried steel structure, the backfill composition comprising at least one of:
    zinc sulfate ($ZnSO_4$); and
    lithium acetate,
    wherein the backfill further comprises between about 0.1% and about 10% by weight of a gelling agent.

13. The backfill composition of claim 12, wherein the backfill further comprises at least one of gypsum and bentonite.

14. The backfill composition of claim 12, wherein the backfill comprises between about 0.25% and about 7% by weight of the gelling agent.

15. The backfill composition of claim 12, wherein the gelling agent is agar or gelatin.

16. The backfill composition of claim 12, wherein the backfill comprises between about 1% and about 5% by weight of the gelling agent.

17. A backfill composition for a probe configured to measure a cathodic protection condition of a buried steel structure, the backfill composition comprising at least one of:
    zinc sulfate ($ZnSO_4$); and
    lithium acetate,
    wherein the backfill comprises between 1% and about 40% by weight of zinc sulfate.

18. The backfill composition of claim 17, wherein the backfill comprises between about 15% and about 25% by weight of zinc sulfate.

19. A backfill composition for a probe configured to measure a cathodic protection condition of a buried steel structure, the backfill composition comprising at least one of:
    zinc sulfate ($ZnSO_4$); and
    lithium acetate,
    wherein the backfill comprises between 1% and about 40% by weight of lithium acetate.

20. The backfill composition of claim 19, wherein wherein the backfill comprises between about 7% and about 15% by weight of lithium acetate.

* * * * *